United States Patent Office 2,865,970
Patented Dec. 23, 1958

2,865,970

SEPARATION OF HYDROCARBONS

Charles L. Thomas, Swarthmore, Pa., assignor to Sun Oil Company, Philadelphia, Pa., a corporation of New Jersey No Drawing. Application August 6, 1957
Serial No. 676,503

8 Claims. (Cl. 260—676)

This invention relates to the separation of hydrocarbons, and is directed particularly to the separation of unsaturated hydrocarbons from mixtures thereof with less unsaturated hydrocarbons.

Various methods are known in the art for separating unsaturated hydrocarbons, from mixtures thereof with less unsaturated hydrocarbons. It is known, for example, to contact such hydrocarbon mixtures with aqueous solutions of monovalent copper or silver salts; during such contact the more highly unsaturated hydrocarbons react to form a loose complex with the metal salt, and the less unsaturated hydrocarbons may be recovered separately from this reaction product. In such prior art procedures it has generally been necessary, due to the low solubility of cuprous or silver salts in water to incorporate compounds such as HCl or $NH_4OH$ into the solutions in order to improve the solubility of the above monovalent metal salts. Use of these solubility promoters, however, has the disadvantage of increasing the corrosiveness of the contact solution, or of requiring expensive recovery steps to prevent excessive loss of the solubility promoter. Also, contact solutions tend to froth during treatment with gaseous mixtures thus causing operational difficulties. These prior art disadvantages are overcome by the present invention.

In accordance with my invention, unsaturated hydrocarbons are separated from mixtures thereof with less unsaturated hydrocarbons by contacting such mixtures either in liquid or gaseous phase with a solid contact material comprising a complex of an amine-type anion exchange resin and a monovalent copper or silver ion; the more unsaturated hydrocarbons selectively react to form a loose complex reaction product with said solid contact material and the unreacted, less unsaturated components of the charge hydrocarbon mixture are separated from this reaction product. The so-formed loose complex is then decomposed as by the application of heat to regenerate the solid contact material and to recover a fraction which comprises a concentrate of the more unsaturated charge components.

The term "unsaturation" as used herein is intended to apply to aliphatic and cylic olefinic and diolefinic hydrocarbons. Aromatic rings are not included within this term as used herein. The term does, however, include unsaturation due to olefinic or diolefinic substituents on an aromatic ring and hence does apply to compounds such as styrene, methyl styrene, and the like. Treatment of acetylenic hydrocarbons by this invention is not contemplated in view of the possibility of forming explosive acetylides with resulting operational hazards.

My invention is well adapted for the separation of a variety of hydrocarbon mixtures. Thus aliphatic or cylic olefins and diolefins may be separated from hydrocarbon mixtures also containing saturated and/or aromatic hydrocarbons; saturates and aromatics are both substantially inert toward the contact material used in this invention. For example, normally gaseous unsaturated compounds such as ethylene, propylene, allene, butylene, and butadiene may be separated from gaseous mixtures also containing saturate hydrocarbons by this invention; or normally liquid unsaturates such as pentenes, cyclopentenes, isoprene, hexenes, cyclohexenes, heptenes, and the like may be separated from liquid hydrocarbon mixtures which also contain saturates, and/or aromatics. In addition, aromatic hydrocarbons having unsaturated ring substituents, e. g., styrene, can be separated from mixtures containing saturates, aromatics, or aromatics with saturate substituents, e. g., ethylbenzene, by this invention.

It is also within the scope of this invention to separate unsaturated hydrocarbons of varying degrees of unsaturation. Diolefins are more reactive with the solid contact material used in this invention than corresponding olefins and the diolefins thus can be concentrated by this invention. For example, butadiene may be separated from butylene, isoprene from isopentene, cyclopentadiene from cyclopentene, and so forth, by the practice of this invention.

My invention is particularly well adapted for the treatment of normally gaseous hydrocarbons such as those obtained by the cracking of petroleum fractions for the concentration of olefins and/or diolefins contained therein. Light petroleum distillate fractions such as gasoline, naphtha, and the like which contain olefins and/or diolefins are also successfully treated by this invention as are many other hydrocarbon mixtures.

The solid contact material used in this invention comprises a complex of an anion exchange resin having amine groups and a monovalent copper or silver ion. Anion exchange resins suitable for use in preparing this contact material have the general formula:

wherein R represents a substantially insoluble organic condensation resin to which functional amine groups are attached; N represents nitrogen; and X represents hydrogen, or an alkyl or substituted alkyl group. Typical anion exchange resins of this type may be prepared by polymerizing an aromatic amine and formaldehyde; or by reacting a polyamine, phenol, and formaldehyde; or by nitrating and then reducing styrene-divinylbenzene copolymers; and the like. Examples of some commercially known anion exchangers which are suitable in preparing the solid contact material used in this invention are those known by the trade names of Amberlite IR–4B, Amberlite IR–45, De-Acidite, Duolite A–3, and Duolite A–4.

The solid complex of an amine-type anion exchanger and a monovalent copper or silver ion may be prepared in a number of ways. One convenient method of preparation comprises admixing granular anion exchange resin of the type described above with an aqueous solution of a suitable salt of monovalent copper or silver. Such a suitable salt may comprise cuprous or silver halide, nitrate, sulfate, acetate, phosphate, formate, propionate, carbonate, lactate, and the like. The cuprous or silver ions readily react with the amine groups of the anion exchanger to form a solid stable complex, which complex, is capable in the practice of this invention of reacting with unsaturated hydrocarbons to form therewith a loose complex reaction product. Excess salt is washed from the anion exchanger-cuprous of silver complex, and after drying, this solid complex is suitable for use in the present invention.

An alternative method of preparing the cuprous-anion exchanger complex contact material used in this invention comprises contacting an amine-type anion exchanger of the type above-described with the water solution of a cupric salt thereby to form a cupric-anion exchanger complex. This complex is then reduced by contact with a suitable agent such as gaseous sulfur dioxide or ethyl mercaptan, or an aqueous alkali metal hydrosulfite, or the like to a cuprous anion exchanger complex suitable for use in this invention.

In carrying out the present invention, the hydrocarbon mixture to be separated is intimately contacted with the solid contact complex at a temperature suitable for the formation of a loose complex reaction product between this contact material and unsaturated hydrocarbon. In general, temperatures below about 100° F. and preferably below about 80° F., as for example in the range of about 0° F. to 80° F., are suitable in practicing this invention.

The intimate contact between the hydrocarbon mixture and the solid complex may be effected in accordance with any of the procedures known in the art for intimately contacting a vapor or a liquid with a solid. For example, this contact may be effected by passing the hydrocarbon mixture through a stationary bed of granular complex contact material. Alternatively, the solid complex contact material may be finely pulverized and contacted with the hydrocarbon mixture in either gaseous or liquid phase in accordance with moving bed or fluidized solid contact procedures known in the art. The contact may be continuous or batchwise, concurrent or countercurrent, according to the requirements of the particular application.

The time of contact as well as the relative proportions of the contact materials are dependent upon the separation desired as well as upon such other factors as the composition of the charge hydrocarbon mixture, capacity of the particular solid reactant, and the like, and may readily be determined for a particular application by those skilled in the art in view of the present specification.

The contact between the hydrocarbon charge mixture and the solid contact complex is terminated prior to or when the solid contact material has completely reacted with the more highly unsaturated charge components. The non-reacted, less unsaturated hydrocarbons are separated from the reaction product and the reaction product is then treated to recover the more unsaturated hydrocarbons and to regenerate the solid contact material. This treatment comprises heating the unsaturated hydrocarbon-complexed contact material reaction product to a temperature sufficient to decompose the reaction product to yield unsaturated hydrocarbon and to regenerate the solid complex of amine anion exchange resin and monovalent copper or silver. In regenerating the solid contact material, care must be taken so as not to destroy the anion exchange resin by heating to too high a temperature. The maximum temperature to which the unsaturated hydrocarbon-complexed contact material can be heated without destroying the anion exchange resin will depend upon the particular resin employed in preparing the solid contact material. Normally, temperatures in the range of about 100° F. to 200° F. are suitable for decomposition of the reaction product. This decomposition is facilitated through the use of reduced pressure and/or an inert stripping gas such as nitrogen. The unsaturated hydrocarbon fraction from this decomposition is separately recovered and comprises a product concentrate of the more unsaturated charge components, while the regenerated solid complex contact material may be recycled to the contact step.

By careful regulation of contact conditions, hydrocarbon mixtures of the type described may be separated into product fractions of high purity in accordance with this invention.

In order to illustrate a specific embodiment of this invention, a solid contact material was prepared from Amberlite IR-4B, a commercially-available amine-type anion exchange resin in granular form, and aqueous AgNO$_3$. About 100 gms. of the resin were supported in a long, vertical, 1-inch diameter glass column. Then, about 100 cc. of a 5 wt. percent aqueous solution of AgNO$_3$ were percolated through the bed of granular resin so formed. After one-half hour the bed was washed, first with distilled water, then with acetone, and allowed to dry. About 100 cc. of a charge blend consisting of a 2 wt. percent solution of piperylene in n-heptane were passed through the bed of solid contact material at an hourly space rate of 0.5 volumes of charge liquid per hour per volume of solid contact material. During the contact, the temperature was maintained at about 75° F. The effluent from the column was collected in separate, consecutive fractions. The first 10 cc. fraction collected had a piperylene content of about 1.0 weight percent. Subsequent 10 cc. fractions showed slightly increasing piperylene contents until, after 65% of the total charge had been collected, the capacity of the solid contact material appeared to be appreciably depleted. Removal of an even greater quantity of piperylene from the charge can be obtained by providing a deeper bed of contact material.

This application is a continuation-in-part of my application Serial Number 463,325, filed October 19, 1954, and now abandoned.

I claim:

1. The method of separating unsaturated hydrocarbons selected from the class consisting of olefins and diolefins from a mixture thereof with less unsaturated hydrocarbons which comprises: contacting said mixture with a solid material comprising a complex of an anion exchange resin having amine groups and a monovalent ion of a metal selected from the class consisting of copper and silver, whereby the more unsaturated hydrocarbons contained in said mixture react with said solid material to form a complex reaction product therewith, and separating unreacted hydrocarbons having a greater percentage of the less unsaturated hydrocarbons than the original charge mixture from said complex reaction product.

2. The method of separating unsaturated hydrocarbons selected from the class consisting of olefins and diolefins from a mixture thereof with less unsaturated hydrocarbons which comprises: contacting said mixture with a solid material comprising a complex of an anion exchange resin having amine groups and a monovalent ion of a metal selected from the class consisting of copper and silver, whereby the more unsaturated hydrocarbons contained in said mixture react with said solid material to form a complex reaction product therewith, separating unreacted hydrocarbons having greater percentage of the less unsaturated hydrocarbons than the original charge mixture from said complex reaction product, and decomposing said complex reaction product to obtain a hydrocarbon product fraction having a greater percentage of the more unsaturated hydrocarbons than the original charge mixture.

3. The method according to claim 1 wherein said monovalent metal ion is a monovalent copper ion.

4. The method according to claim 1 wherein said monovalent metal ion is monovalent silver ion.

5. The method of separating unsaturated hydrocarbons selected from the class consisting of olefins and diolefins from a mixture thereof with less unsaturated hydrocarbons which comprises contacting said mixture with a solid material comprising a complex of an anion exchange resin having amine groups and a monovalent ion of a metal selected from the class consisting of copper and silver, at a temperature below about 80° F., whereby the more unsaturated hydrocarbons contained in said mixture react with said solid material to form a complex reaction product therewith, separating unreacted hydrocarbons having a greater percentage of the less unsaturated hydrocarbons than the original charge mixture from said complex reaction product, and decomposing the complex reaction product to obtain a hydrocarbon product fraction having a greater percentage of the more unsaturated hydrocarbons than the original charge mixture.

6. The method according to claim 5 wherein said hydrocarbon mixture to be separated comprises normally gaseous hydrocarbons.

7. The method of separating an olefin hydrocarbon from a mixture thereof with less unsaturated hydrocarbons which comprises contacting said mixture with a solid material comprising a complex of an anion exchange resin having amine groups and a monovalent ion of a metal selected from the class consisting of copper and silver, at a temperature below about 80° F., whereby the olefin hydrocarbon contained in said mixture reacts with said solid material to form a complex reaction product therewith, separating unreacted hydrocarbons from said complex reaction product, and decomposing the complex reaction product to obtain a hydrocarbon product comprising a concentrate of the olefin hydrocarbon.

8. The method of separating a diolefin hydrocarbon from a mixture thereof with less unsaturated hydrocarbons which comprises contacting said mixture with a solid material comprising a complex of an anion exchange resin having amine groups and a monovalent ion of a metal selected from the class consisting of copper and silver, at a temperature below about 80° F., whereby the diolefin hydrocarbon contained in said mixture reacts with said solid material to form a complex reaction product therewith, separating unreacted hydrocarbon from said complex reaction product and decomposing said complex reaction product to obtain a hydrocarbon product fraction comprising a concentrate of the diolefin hydrocarbon.

No references cited.